(12) United States Patent
Ino (10) Patent No.: US 11,196,615 B2
(45) Date of Patent: Dec. 7, 2021

(54) REDUNDANT SYSTEM

(71) Applicant: SUBARU CORPORATION, Tokyo (JP)

(72) Inventor: Hiroto Ino, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 118 days.

(21) Appl. No.: 16/671,812

(22) Filed: Nov. 1, 2019

(65) Prior Publication Data

US 2020/0169454 A1 May 28, 2020

(30) Foreign Application Priority Data

Nov. 27, 2018 (JP) .............................. JP2018-220889
Sep. 30, 2019 (JP) .............................. JP2019-179204

(51) Int. Cl.
*H04L 12/24* (2006.01)
*H04L 12/703* (2013.01)

(52) U.S. Cl.
CPC .......... *H04L 41/0654* (2013.01); *H04L 45/28* (2013.01)

(58) Field of Classification Search
CPC .. H04L 41/0654; H04L 45/28; G06F 11/1658; G06F 11/2035; G06F 11/203; G06F 11/2012; G06F 11/2007
See application file for complete search history.

(56) References Cited

U.S. PATENT DOCUMENTS

| | | | |
|---|---|---|---|
| 2006/0253726 A1 | 11/2006 | Kukshya et al. | |
| 2016/0189139 A1* | 6/2016 | Lee ....................... | G06Q 20/202 |
| | | | 705/13 |
| 2017/0242764 A1 | 8/2017 | Antony et al. | |
| 2018/0278546 A1* | 9/2018 | Yousefi ................... | H04L 69/22 |

FOREIGN PATENT DOCUMENTS

| | | | | |
|---|---|---|---|---|
| JP | 08-265319 A | | 10/1996 | |
| JP | 2007180830 A | * | 7/2007 | ............... G05B 9/02 |

OTHER PUBLICATIONS

Extended European Search Report issued in corresponding European Patent Application No. 19207046.4-1224, dated May 4, 2020.

* cited by examiner

*Primary Examiner* — Jung H Park
(74) *Attorney, Agent, or Firm* — McDermott Will & Emery LLP (57) ABSTRACT

A redundant system includes devices communicably coupled via communication paths. Each device is communicably coupled via two or more of the communication paths to two or more of the other devices. Each device performs wired communication via the communication paths with the devices communicably coupled to the each device via the communication paths in a normal state. Each device includes a wireless communication unit. When each device communicates with the two or more of the other devices under a condition that malfunction occurs in two or more parts in the redundant system, the each device performs the wired communication via the communication path with a counterpart device with which the wired communication via the communication path is enabled, and switches from the wired communication via the communication path to wireless communication and continues communication with the counterpart device with which the wired communication via the communication path is disabled.

13 Claims, 9 Drawing Sheets

REDUNDANT SYSTEM

CROSS-REFERENCE TO RELATED APPLICATIONS

The present application claims priority from Japanese Patent Application No. 2018-220889 filed on Nov. 27, 2018 and Japanese Patent Application No. 2019-179204 filed on Sep. 30, 2019, the entire contents of which are hereby incorporated by reference.

BACKGROUND

The disclosure relates to a redundant system and, more particularly, to a redundant system including multiple devices mounted in an aircraft.

Figure 7:
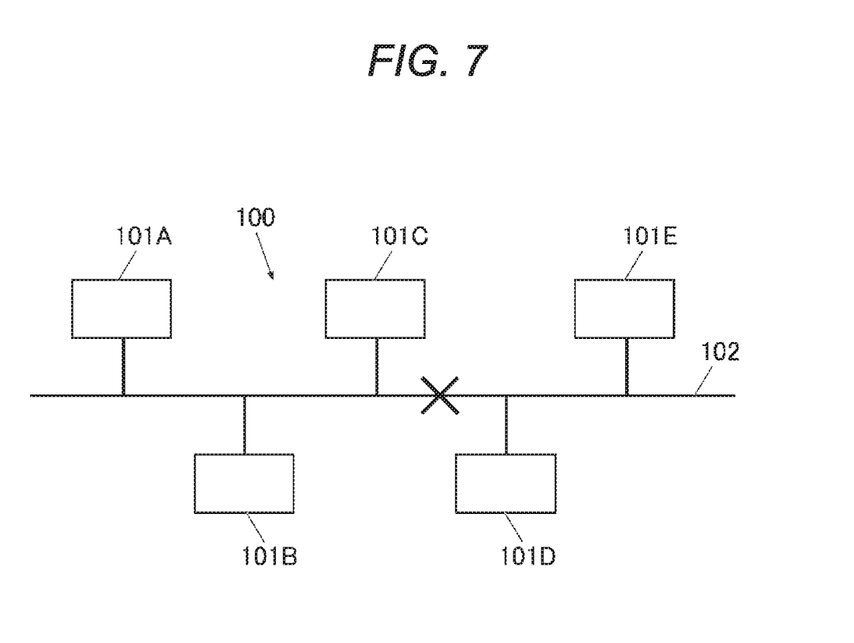
FIG. 7 illustrates an example in which malfunction has occurred in a bus of a system in which multiple devices are communicably coupled via the bus.

When multiple devices are communicably coupled via a communication path such as a signal line to constitute a system, multiple devices 101A to 101E may be communicably coupled via a bus 102 that is a communication path to constitute a system 100 as illustrated in, for example, FIG. 7. In this case, however, when malfunction such as a wire break occurs in the bus 102, communication between the devices is interrupted in a malfunction part, indicated by the sign "x", of the bus 102 and the system 100 is divided into two groups. In FIG. 7, one group includes the devices 101A to 101C, and the other group includes the devices 101D and 101E.

It is noted that a part in which malfunction has occurred will be indicated by the sign "x" in the following figures.

To avoid the occurrence of such a state, when multiple devices are communicably coupled via communication paths to construct a system, the system may be constructed so that each of the devices is communicably coupled to two or more of the devices other than the each of the devices via communication paths (see, for example, Japanese Unexamined Patent Application Publication No. H8-265319).

Figure 8:
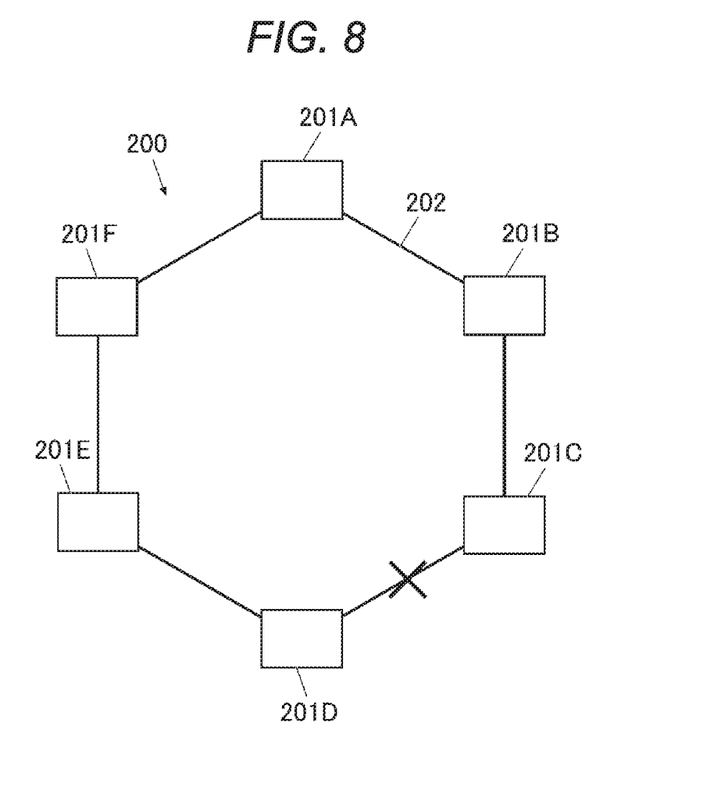
FIG. 8 illustrates an example in which malfunction has occurred in communication paths of a redundant system in which multiple devices are communicably coupled in a ring shape via the communication paths.

That is, as illustrated in FIG. 8, for example, each of six devices 201A to 201F such as computers may be communicably coupled to two or more of the devices other than the each of the six devices 201A to 201F via communication paths 202 to construct a system 200.

When each of multiple devices of a system is communicably coupled to two or more of the devices other than the each of the devices via communication paths as described above, this configuration may be expressed by the phrase that "multiple devices are communicably coupled in a ring shape via communication paths", for the purpose of simplifying the description.

In such a configuration, even when, for example, malfunction such as a wire break occurs in the communication path 202 as illustrated in FIG. 8, the multiple devices 201A to 201F are kept communicably coupled to each other via the communication paths 202. Accordingly, even when malfunction occurs in any of the communication paths 202, the multiple devices 201A to 201F are not divided into two groups unlike the system 100 (see FIG. 7), and communication may be continued among the devices 201A to 201F via the communication paths 202.

As illustrated in FIG. 8, the system 200 is configured such that the multiple devices 201A to 201F are communicably coupled in a ring shape via the communication paths 202, which provides the redundancy of the system 200.

In the following description, a system having the redundancy as described above will be referred to as a "redundant system".

SUMMARY

An aspect of the disclosure provides a redundant system including multiple devices communicably coupled via communication paths. Each of the devices is communicably coupled via two or more of the communication paths to two or more of the devices other than the each of the devices. The each of the devices is configured to perform wired communication via the two or more of the communication paths with the devices communicably coupled to the each of the devices via the two or more of the communication paths in a normal state. the each of the devices includes a wireless communication unit. When the each of the devices communicates with the two or more of the devices other than the each of the devices under a condition that malfunction occurs in two or more parts in the redundant system, the each of the devices performs the wired communication via the communication path with a counterpart device with which the wired communication via the communication path is enabled, and switches from the wired communication via the communication path to wireless communication and continues communication with a counterpart device with which the wired communication via the communication path is disabled.

DETAILED DESCRIPTION

Figure 9A:
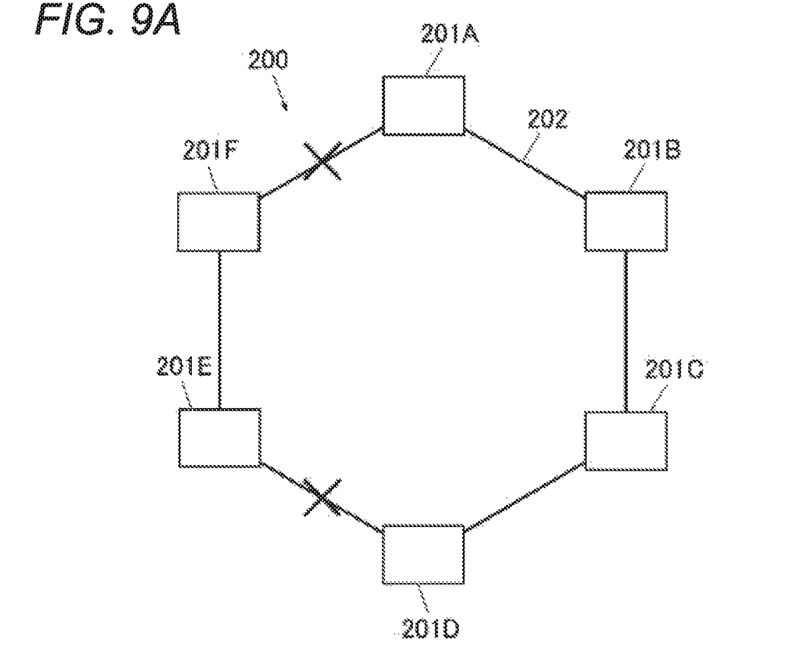
FIG. 9A illustrates a state in which malfunction has occurred in two communication paths of the redundant system in FIG. 8.

Even in a redundant system 200 in which multiple devices are communicably coupled in a ring shape via communication paths, when malfunction occurs in two or more communication paths 202 of the redundant system 200 as illustrated in FIG. 9A, the redundant system 200 is divided into two groups. In FIG. 9A, one group includes devices 201A to 201D, and the other group includes devices 201E and 201F.

Figure 9B:
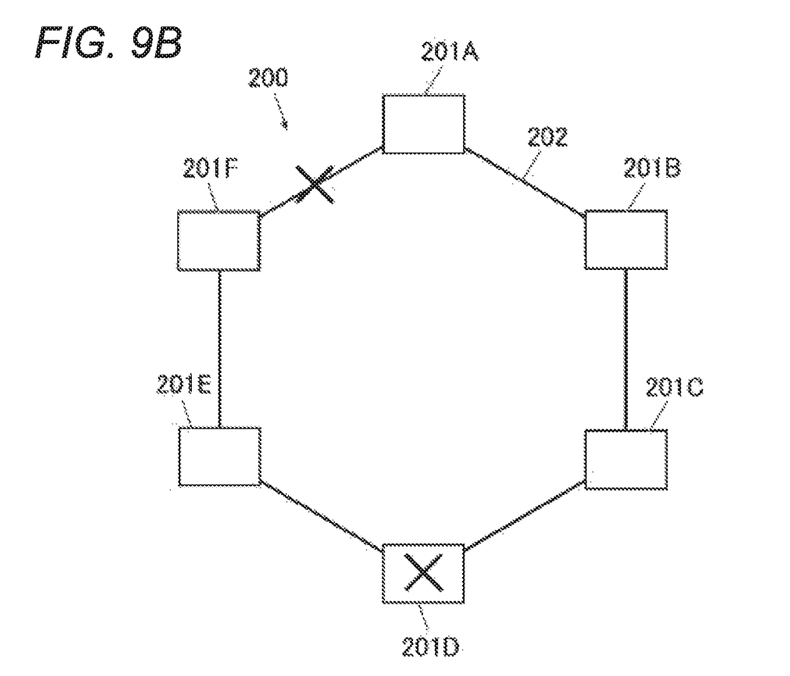
FIG. 9B illustrates a state in which malfunction has occurred in a communication path and a device of the redundant system in FIG. 8.

In addition, when malfunction occurs not only in any of the communication paths 202, but also in any of the devices as illustrated in FIG. 9B (specifically, malfunction occurs in the communication path 202 and the device 201D in FIG. 9B), the redundant system 200 is also divided into two groups. In FIG. 9B, one group includes the devices 201A to 201C, and the other group includes the devices 201E and 201F.

In these cases, a device of a certain group may be unable to communicate with any device of a group(s) other than the certain group.

As described above, even in the redundant system in which the multiple devices are communicably coupled in a ring shape via the communication paths, when malfunction occurs in two or more parts, the system may be divided into multiple groups, and a device of a certain group may be unable to communicate with any device of a group(s) other than the certain group.

It is desirable to provide a redundant system, including multiple devices communicably coupled in a ring shape via communication paths, that allows devices in which malfunction does not occur to continue communication with each other even when malfunction occurs in two or more parts in the redundant system.

A redundant system according to an embodiment of the disclosure will be described below with reference to the drawings.

It is assumed that the redundant system is mounted in an aircraft, but the disclosure is not limited to this example.

In addition, when each of the multiple devices of the redundant system is communicably coupled to two or more of the devices other than the each of the multiple devices via the communication paths, this configuration may be expressed by the phrase that the multiple devices are communicably coupled in a ring shape via the communication paths, for the purpose of simplifying the description. It is appreciated that this does not limit an actual redundant system to one having a ring shape without a twist.

Figure 1:
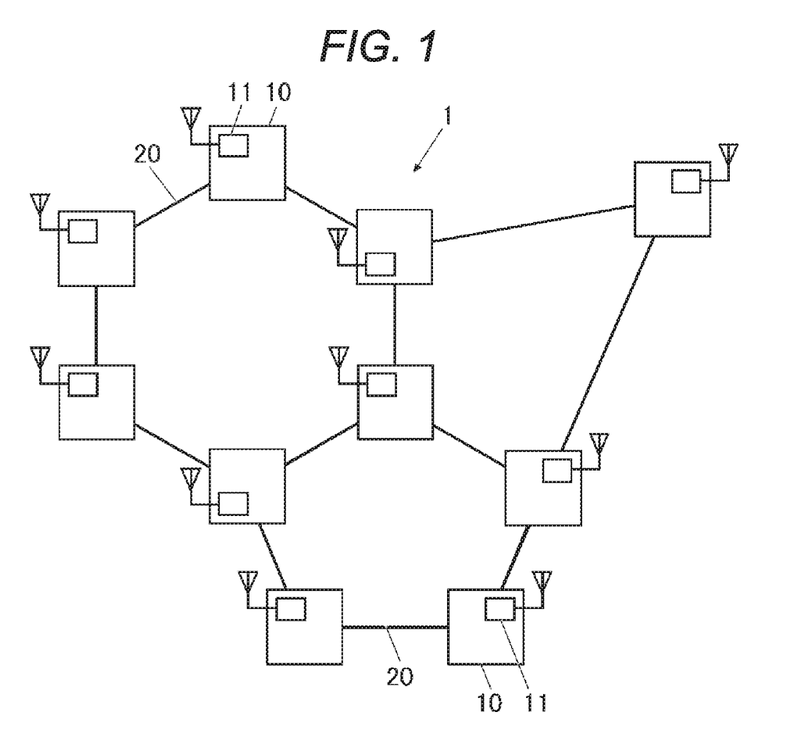
FIG. 1 illustrates an example of the configuration of a redundant system according to an embodiment.

FIG. 1 illustrates an example of the configuration of the redundant system according to the embodiment.

A redundant system 1 according to the embodiment includes multiple devices 10 communicably coupled via communication paths 20 such as signal lines. Each of the devices 10 is communicably coupled via the communication paths 20 to two or more of the devices 10 other than the each of the devices 10. That is, the redundant system 1 according to the embodiment includes the multiple devices 10 communicably coupled in the ring shape via the communication paths 20. The redundant system 1 in FIG. 1 includes the multiple devices 10 communicably coupled in multiple ring shapes in a combined manner via the communication paths 20. Alternatively, the redundant system 1 may include the multiple devices 10 communicably coupled in a single ring shape via the communication paths 20, for example, like the redundant system 200 illustrated in FIG. 8.

In this case, when the redundant system 1 is configured such that all or many of the devices 10 in the aircraft are communicably coupled to each other via the communication paths 20 or the devices 10 physically distant from each other are communicably coupled to each other via the communication paths 20, the volume of the hardware of the redundant system 1 may increase or the number of the communication paths 20 may increase, which may result in an increase in the weight of the aircraft. However, when the redundant system 1 is configured such that the devices 10 physically close to each other are communicably coupled to each other via the communication paths 20, the redundant system 1 can avoid the increase in the weight of the aircraft.

In place of the configuration that the devices 10 physically close to each other are communicably coupled to each other in a single ring shape via the communication paths 20, the devices 10 physically close to each other are communicably coupled in multiple ring shapes in a combined manner via the communication paths 20 as illustrated in FIG. 1, which provides the redundancy.

The devices 10 are, for example, computers and modules mounted in an aircraft. The devices 10 uniquely perform processes such as control of equipment and appliances of a power system, a steering system, a power supply system, and a communication system.

As described above, in the redundant system 1 according to the embodiment, the devices 10 constituting the redundant system 1 do not include an alternative device that performs no work in a normal state, that is, a state in which no malfunction occurs in the communication paths 20, and each of the devices 10 performs a unique process. Alternatively, the devices 10 of the redundant system 1 may include an alternative device that performs no process in the normal state.

In the normal state, each of the devices 10 performs wired communication via the communication paths 20 with the devices 10 (referred to below as the adjacent devices 10) communicably coupled to the each of the device 10 via the communication paths 20.

In addition, each of the devices 10 communicates with the adjacent devices 10 periodically or at predetermined timings (for example, at a timing when transmitting or receiving a signal or data) to confirm that wired communication with the adjacent devices 10 via the communication paths 20 is established, that is, communicable coupling via the communication paths 20 is maintained and no malfunction occurs in the communication paths 20.

In addition, when the device 10 becomes unable to perform the wired communication with any of the adjacent devices 10 via the communication path 20 due to, for example, occurrence of malfunction (such as a wire break that disables the wired communication via the communication paths 20) in the communication path 20, the device 10 notifies all the devices 10 of the redundant system 1 by transmitting a signal indicating that the wired communication is disabled, using the wired communication via the communication paths 20 other than the communication path 20 through which the wired communication is disabled. Upon receipt of the signal, each of the devices 10 recognizes that wired communication between a certain pair of the devices 10 via the communication path 20 is disabled (that is, malfunction has occurred in the communication path 20 therebetween).

As in the redundant system 200 (see FIG. 8) in the related art described above, the multiple devices 10 of the redundant system 1 are kept communicably coupled to each other via the communication paths 20 in the redundant system 1 according to the embodiment even when malfunction occurs in one of the communication paths 20. Therefore, the wired communication between the devices 10 via the communication paths 20 continues.

However, malfunction may occur in two or more parts in the redundant system 1. For example, malfunction occurs in one part in the redundant system 1, and then malfunction occurs in another part in the redundant system 1. Or, malfunction occurs in two or more parts in the redundant system 1 at the same time. In this case, even in the redundant system 1 according to the embodiment, the wired communication via the communication paths 20 is interrupted in the parts in which malfunction has occurred.

In order to prevent the interruption of the wired communication via the communication paths 20 in the parts in which malfunction has occurred, each of the devices 10 according to the embodiment includes a wireless communication unit 11.

When malfunction occurs in two or more parts in the redundant system 1, each of the multiple devices 10 of the redundant system 1 (i) performs the wired communication via the communication path 20 with a counterpart device 10 with which wired communication via the communication path 20 is enabled and (ii) switches from the wired communication via the communication path 20 to wireless communication and continues communication with a counterpart device 10 with which the wired communication via the communication path 20 is disabled.

With this configuration, even when malfunction occurs in two or more parts in the redundant system 1 and the wired communication between the devices 10 via the communication paths 20 is disabled, communication between the devices 10 in which no malfunction occurs continues in a wireless manner instead of the wired communication via the communication paths 20.

Specific descriptions will be given below.

Case where Malfunction Occurs in Two Communication Paths

Malfunction includes either one or both of malfunction in the communication path 20 and malfunction in the device 10. Description will be made on the case in which malfunction occurs in two communication paths 20 of the redundant system 1, to show a method for continuing communication between the devices 10 even when malfunction occurs in the redundant system 1 according to the embodiment.

In the following, the description will be made on the case in which malfunction occurs in one communication path 20 of the redundant system 1 and then malfunction occurs in a communication path 20 other than the one communication path 20 (that is, the case malfunction occurs in the two communication paths 20 at different timings). This description is applicable to the case in which malfunction occurs in two communication paths 20 of the redundant system 1 at the same time.

Figure 2:
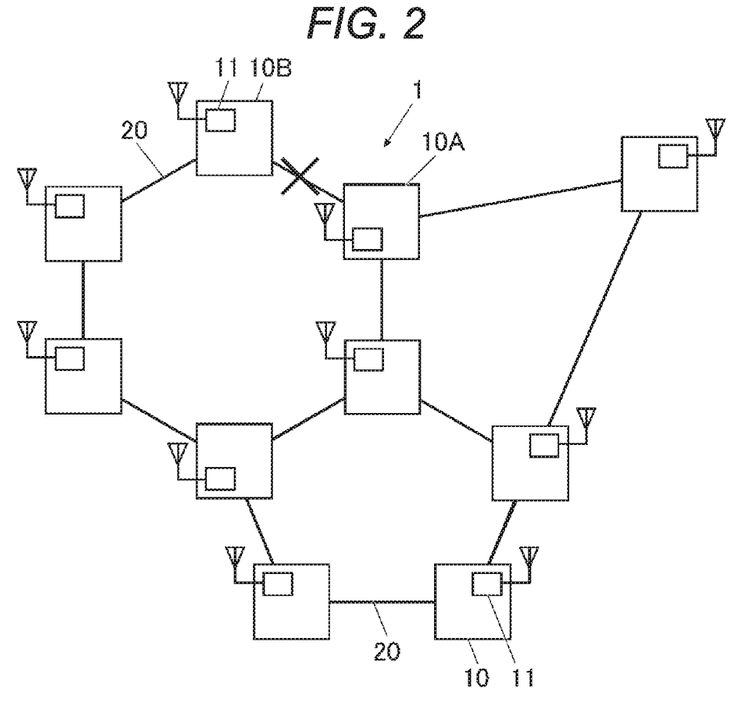
FIG. 2 illustrates an example in which malfunction has occurred in a communication path.

It is assumed that malfunction occurs in the communication path 20 through which a device 10A is communicably coupled to a device 10B as illustrated in FIG. 2, and then malfunction occurs in the communication path 20 other than the communication path 20 in which the malfunction has already occurred. Even in this case, if the latter malfunction occurs in the communication path 20 as illustrated in, for example, either one of FIGS. 3A and 3B, the redundant system 1 according to the embodiment keeps all the devices 10 communicably coupled via the communication paths 20.

Therefore, the redundant system 1 continues to function as a single system.

In the case where the redundant system is formed in a single ring via the communication paths 202 like the redundant system 200 illustrated in FIG. 8, if malfunction occurs in two of the communication paths of the redundant system 200, the redundant system 200 is divided into two groups (specifically, a group including the devices 201A to 201D and a group including the devices 201E and 201F) as illustrated in FIG. 9A, and the redundant system 200 no longer continues to function as a single system.

In contrast, in the case where the redundant system 1 is configured such that the multiple devices 10 are communicably coupled in multiple ring shapes in a combined manner via the communication paths 20 as illustrated in FIG. 1, even if malfunction occurs in two of the communication paths 20, all the devices 10 is kept communicably coupled via the communication paths 20, and the redundant system 1 continues to function as a single system as described above.

Figure 3A:
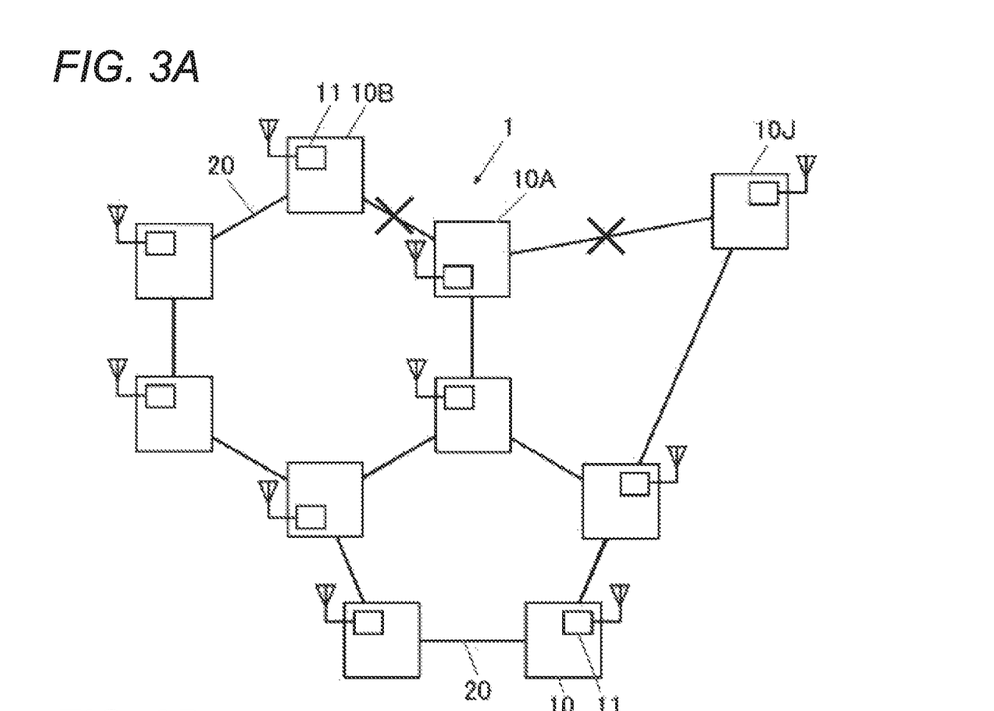
FIGS. 3A and 3B illustrate examples in which all devices are kept communicably coupled via communication paths even when malfunction has occurred in two communication paths.

In the redundant system 1 according to the embodiment, when malfunction occurs in two of the communication paths, for example, when malfunction occurs in the communication path 20 through which the device 10A is communicably coupled to the device 10B and then malfunction occurs in the communication path 20 through which the device 10A is communicably coupled to a device 10J as illustrated in FIG. 3A, the device 10A and the device 10J transmit signals (referred to below as "communication outage signals") indicating that the wired communication with the corresponding devices 10J and 10A via the communication paths 20 is disabled, via the communication paths 20 other than the communication paths 20 through which the wired communication is disabled, using the wired communication.

In this case, all the devices 10 in the redundant system 1 are communicably coupled via the communication paths 20. Each of the devices 10 receives both the communication outage signal transmitted from the device 10A and the communication outage signal transmitted from the device 10J.

Therefore, according to the embodiment, upon receipt of the communication outage signals from these two devices 10, each of the devices 10 recognizes that malfunction has occurred in the communication paths 20 through which the two devices 10 are communicably coupled and that all the devices 10 are kept communicably coupled via the communication paths 20 (that is, the redundant system 1 continues to function as a single system) even when the malfunction has occurred.

In this case, each of the devices 10 notifies a user of the occurrence of malfunction, prompts the user for repair, and continues wired communication via the communication paths 20 with the devices 10.

Figure 4A:
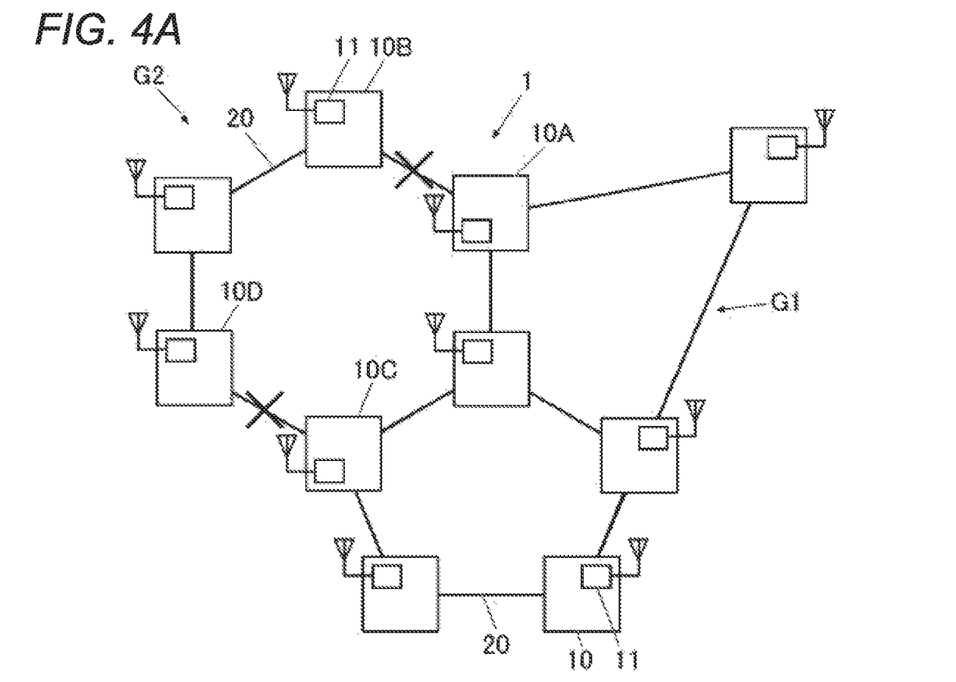
FIGS. 4A and 4B illustrate an example in which malfunction has occurred in two communication paths and the redundant system has been divided into two groups.

On the other hand, for example, it is assumed that malfunction occurs in the communication path 20 through which the device 10A is communicably coupled to the device 10B as illustrated in FIG. 2 and then malfunction occurs in the communication path 20 through which a device 10C is communicably coupled to a device 10D as illustrated in FIG. 4A. In this case, in the redundant system 1, the devices 10 of a group G1 (see FIG. 4B) including the devices 10A and 10C can perform wired communication with each other via the communication paths 20, and the devices 10 of a group G2 including the devices 10B and 10D can perform wired communication with each other via the communication paths 20. However, disabled is wired communication between the groups G1 and G2 via the communication paths 20.

The redundant system 1 is divided into two groups, that is, the groups G1 and G2.

Figure 5:
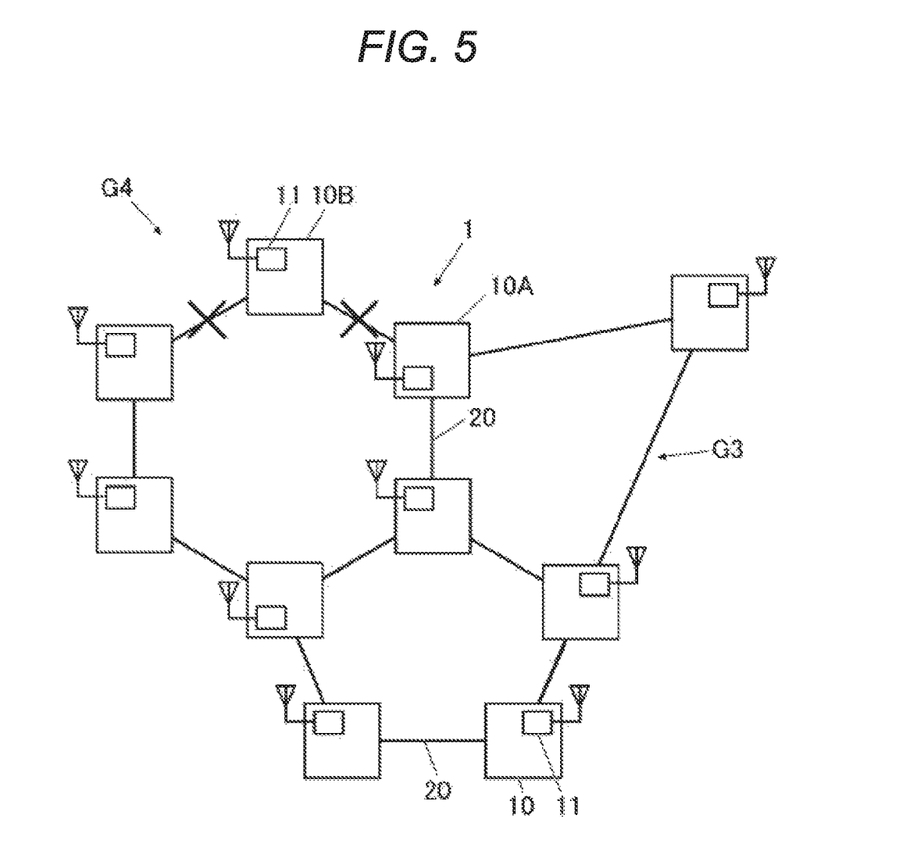
FIG. 5 illustrates a group consisting of one device that is unable to perform wired communication with any of devices other than the one device.

When the two communication paths 20 in which malfunction has occurred are two communication paths 20 communicably coupled to, for example, the device 10B as illustrated in FIG. 5, the device 10B becomes unable to perform wired communication with any devices 10 other than the device 10B via the communication paths 20.

According to the embodiment, however, even when one device 10 (the device 10B in this example) becomes unable to perform wired communication with any devices 10 other than the device 10B via the communication paths 20, the one device 10 is treated as a group, that is, a group G4 consisting of the device 10B that is unable to perform wired communication with any devices 10 other than the device 10B via the communication paths 20.

As described above, among the devices 10 in the redundant system 1 in which malfunction has occurred in two or more parts in the redundant system 1, multiple devices 10 capable of performing wired communication with each other via the communication paths 20 are treated as a group, and one device 10 that is unable to perform wired communication with the device 10 other than the one device 10 via the communication paths 20 is treated as a group.

Therefore, after malfunction occurs in two or more parts in the redundant system 1, the devices 10 of the redundant system 1 belong to any of groups. As a result, there may be a group including multiple devices 10 and a group consisting of one device 10.

In the following descriptions, wireless communication between a device 10 of one group and a device 10 of a group other than the one group may be referred to as wireless communication between the groups for simplification.

Figure 4B:
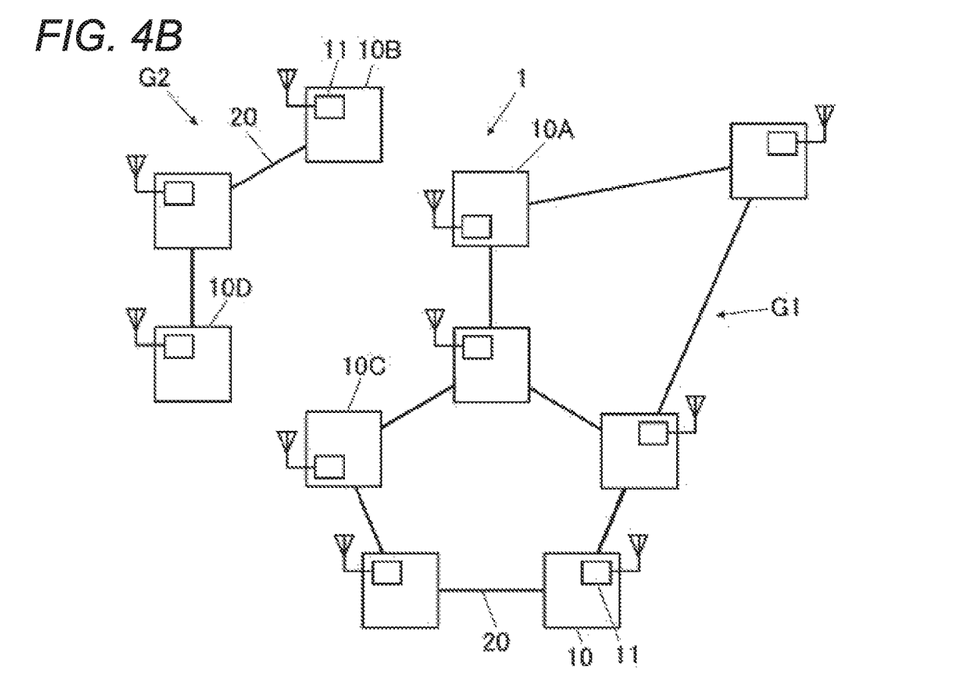

Description will be made on an example in which each group includes multiple devices 10 as illustrated in FIGS. 4A and 4B, below. It is noted that the following description is applicable to an example in which a group consists of one device 10.

Figure 3B:
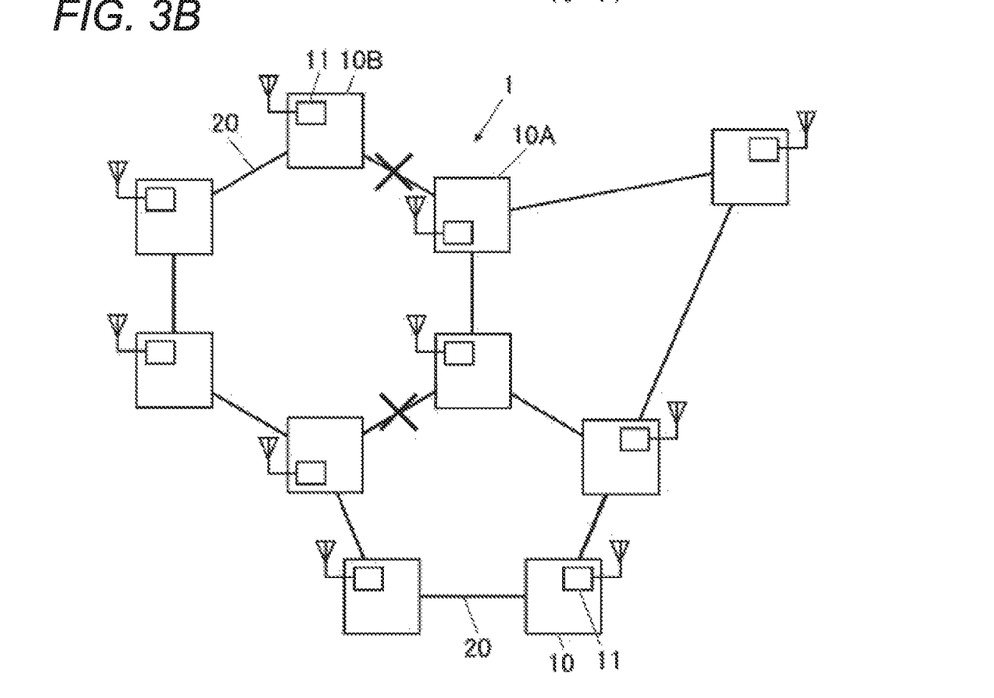

Depending on the communication paths 20 in which malfunction occurs, the redundant system 1 illustrated in FIG. 1 may continue to function as a single system as illustrated in FIGS. 3A and 3B, or the redundant system 1 may be divided into two groups G1 and G2 as illustrated in FIGS. 4A and 4B and disabled is wired communication between the groups G1 and G2 via the communication paths 20.

Therefore, according to the embodiment, each of the devices 10 determines whether (i) the redundant system 1 is continuing to function as a single system or (ii) the redundant system 1 has been divided into the two groups G1 and G2, based on the communication outage signals transmitted from the devices 10 that are unable to perform wired communication with the adjacent devices 10 via the communication paths 20 due to occurrence of malfunction in the communication paths 20.

That is, when malfunction occurs in, for example, the communication path 20 through which the device 10A is communicably coupled to the device 10J as illustrated in FIG. 3A, both the communication outage signal transmitted from the device 10A and the communication outage signal transmitted from the device 10J are transmitted to all the devices 10.

Therefore, upon receipt of the two communication outage signals, each of the devices 10 determines that all the devices 10 are kept communicably coupled via the communication paths 20 even though malfunction has occurred (that is, the redundant system 1 continues to function as a single system).

In this case, each of the devices 10 notifies a user of the occurrence of malfunction, prompts the user for repair, and continues wired communication via the communication paths 20 with the devices 10.

Alternatively, as illustrated in FIGS. 4A and 4B, when malfunction occurs in, for example, the communication path 20 through which the device 10C is communicably coupled to the device 10D, the communication outage signal from the device 10C is transmitted to the devices 10 of the group G1, but the communication outage signal from the device 10D is not transmitted to the devices 10 of the group G1. In addition, the communication outage signal from the device 10D is transmitted to the devices 10 of the group G2, but the communication outage signal from the device 10C is not transmitted to the devices 10 of the group G2.

As described above, according to the embodiment, when each of the devices 10 receives the communication outage signal from one device 10 and does not receives the communication outage signal from the other device 10, the each of the devices 10 determines that malfunction has occurred and the redundant system 1 has been divided into the two groups G1 and G2.

In the latter case, the each of the devices 10 recognizes which of the devices 10 is communicable to the each of the devices 10 via the communication paths 20, by exchanging information with other devices 10.

For example, in the example illustrated in FIGS. 4A and 4B, each of the devices 10 of the group G1 including the device 10A recognizes (i) that the group G1 includes the seven devices 10 (including the each of the devices 10) communicable via the communication paths 20 and (ii) which of the ten devices 10 the group G1 includes. In addition, each of the devices 10 of the group G2 including the device 10B recognizes (i) that the group G2 includes the three devices 10 communicable via the communication paths 20 and (ii) which of the ten devices 10 the group G2 includes.

When each of the devices 10 communicates with the devices 10 of the group to which the each of the devices 10 belongs, the each of the devices 10 performs wired communication via the communication paths 20. When each of the devices 10 communicates across groups, the each of the devices 10 switches to wireless communication using the wireless communication unit 11 to continue the communication.

Wireless communication between groups will be specifically described below.

Wireless Communication Between Groups

In the wireless communication between groups, single input and single output (SISO) wireless communication may be performed between one of the devices 10 of the group G1 and one of the devices 10 of the group G2.

However, wireless communication has a higher error rate and lower reliability than wired communication via the communication paths 20. Instead of the SISO wireless communication, either one of multi input and multi output (MIMO) wireless communication, multi input and single output (MISO) wireless communication, and single input and multi output (SIMO) wireless communication may be performed between the groups G1 and G2. Such a configuration further improves the reliability of wireless communication between groups.

When either one of MIMO, MISO, and SIMO wireless communications is performed, for example, if a signal is transmitted from the device 10B to the device 10A using wireless communication in the state illustrated in FIGS. 4A and 4B, the signal is transmitted from all (or one or ones) the devices 10 of the group G2 and then received by all (or one or ones of) the devices 10 of the group G1.

Upon receipt of the signal, all (or one or ones of) the devices 10 of the group G1 transmit the received signal to the device 10A via the communication paths 20 using the wired communication.

Meanwhile, when wireless communication is performed between groups, the devices 10 of different groups that perform wireless communication, the output of wireless communication, and the like may be improved based on the physical distance between the devices 10 of the different groups, the noise strength of wireless communication, and the radio characteristics.

Specifically, when wireless communication is performed between, for example, the device 10A and the device 10B in the state illustrated in FIGS. 4A and 4B, the communication strength of wireless communication may become weak if the physical distance between the device 10A and the device 10B is large. In addition, if there is equipment that generates a large noise near either one of the device 10A and the device 10B, a large noise may be added to the wireless communication between the devices 10A and 10B.

In addition, when an obstacle is present between the device 10A and the device 10B, the obstacle may interfere with the radio waves of wireless communication. Conversely, the radio waves of wireless communication between the device 10A and the device 10B may be amplified by reflection or diffraction by an object, such as a wall, other than the device 10A and the device 10B.

Therefore, when wireless communication is performed between the groups G1 and G2 as described above, wireless communication may be improved by determining the devices 10 that perform transmission and reception in wireless communication so as to be improved those conditions and determining the output and the like in wireless communication.

In this case, at the time when malfunction occurs and the redundant system 1 is divided into two groups G1 and G2, an improvement process may be performed in one or ones of the devices 10 of the groups G1 and G2 based on situations such as noise and an obstacle and the sensitivity of wireless communication in the devices 10, to determine which of (one or ones of) devices 10 of the groups perform wireless communication and how much output power is used in wireless communication.

In addition, a table may be prepared in advance that defines which (one or ones of) devices 10 of the groups performs wireless communication and how much output power is used in the wireless communication when malfunction occurs in two communication paths 20 of the redundant system 1, for all combinations of two communication paths 20. At the time when a malfunction occurs and the redundant system 1 is divided into two groups G1 and G2, (i) whether each of the devices 10 performs wireless communication and (ii) the strength of the wireless communication may be determined based on the table.

Classification into A Main Group or An Isolated Group

As described above, the reliability of wireless communication is lower than that of wired communication via the communication paths 20.

The redundant system 1 according to the embodiment switches the communication between groups to wireless communication when malfunction has occurred and the redundant system 1 has been divided into two groups. Since the reliability of wireless communication is lower than that of wired communication via the communication paths 20, such a measure is an emergency measure and is taken until wired communication via the communication paths 20 is recovered.

Since the reliability of wireless communication is lower than that of wired communication via the communication paths 20, the amount of wireless communication is desirably reduced.

Accordingly, for example, two groups generated due to occurrence of malfunction is classified into a main group and an isolated group. When communication between the groups is switched from wired communication via the communication paths to wireless communication, data including signals, information, and parameters (the same applies to the following) is transmitted from the isolated group to the main group using wireless communication, but no data is basically transmitted from the main group to the isolated group. When the isolated group requests transmission of data, the main group may simply transmit the requested data to the isolated group using wireless communication.

In this case, each group may be classified into a main group or an isolated group based on, for example, the number of devices 10 of each group. For example, in the example illustrated in FIGS. 4A and 4B, the group G1 includes the seven devices 10 and the group G2 includes the three devices 10. Then, the group G1 is classified into the main group, and the group G2 is classified into the isolated group. In addition, in the example illustrated in FIG. 5, a group G3 including the device 10A is classified into the main group, and a group G4 including the device 10B is classified into an isolated group. In an example illustrated in FIGS. 6A and 6B which will be described later, a group G5 including the device 10A is classified into the main group, and a group G6 including the device 10B is classified into the isolated group.

In this case, when malfunction occurs, wireless communication is performed between the groups to exchange the number of the devices 10 of the groups, so that each of the devices 10 knows whether the group to which the each of the devices 10 belongs is the main group or the isolated group.

For example, in the case where the redundant system 1 includes a management device that manages the redundant system 1, the group including this management device may be classified into the main group, and the other group may be classified into the isolated group. As described above, the method for classification into the main group or the isolated group is determined as appropriate.

In this manner, wireless communication from the main group to the isolated group is simply limited to necessary communication, so that the amount of wireless communication in the entire redundant system 1 is reduced while the reliability of the entire redundant system 1 is maintained.

Case where Malfunction Occurs in Three or More Communication Paths

The description has been made on the case in which malfunction occurs in two communication paths 20 in the redundant system 1. The above description is applicable to the case in which malfunction occurs in three or more communication paths 20.

In this case, even when malfunction occurs in three or more communication paths 20 of the redundant system 1, all the devices 10 of the redundant system 1 may be kept communicably coupled via the communication paths 20 and the redundant system 1 continues to function as a single system, or the redundant system 1 may be divided into two groups as described above. Since the same configuration as above may be adopted in these cases, descriptions thereon will be omitted.

When malfunction occurs in three or more communication paths 20 of the redundant system 1 and the redundant system 1 is divided into three or more groups, communication between the devices 10 of each group is performed using wired communication via the communication paths 20, and communication between the groups is performed using wireless communication.

Also in this case, one of the groups may be classified into the main group based on the number of the devices 10 of the groups and the presence or absence of the management device. The groups other than the main group may be classified into isolated groups.

Similarly to the case in which malfunction occurs in two communication paths 20 of the redundant system 1, each of the devices 10 may determine the group to be classified into the main group and the groups to be classified into the isolated groups at the time when malfunction occurs in two or more communication paths 20 of the redundant system 1.

In addition, a table may be prepared in advance that defines a group to be classified into the main group and groups to be classified into the isolated groups when malfunction occurs in the redundant system 1, for all combinations of two or more communication paths 20. When malfunction occurs, each of the devices 10 may recognize the classification of the groups with reference to the table.

Case where Malfunction Occurs in a Device

Figure 6A:
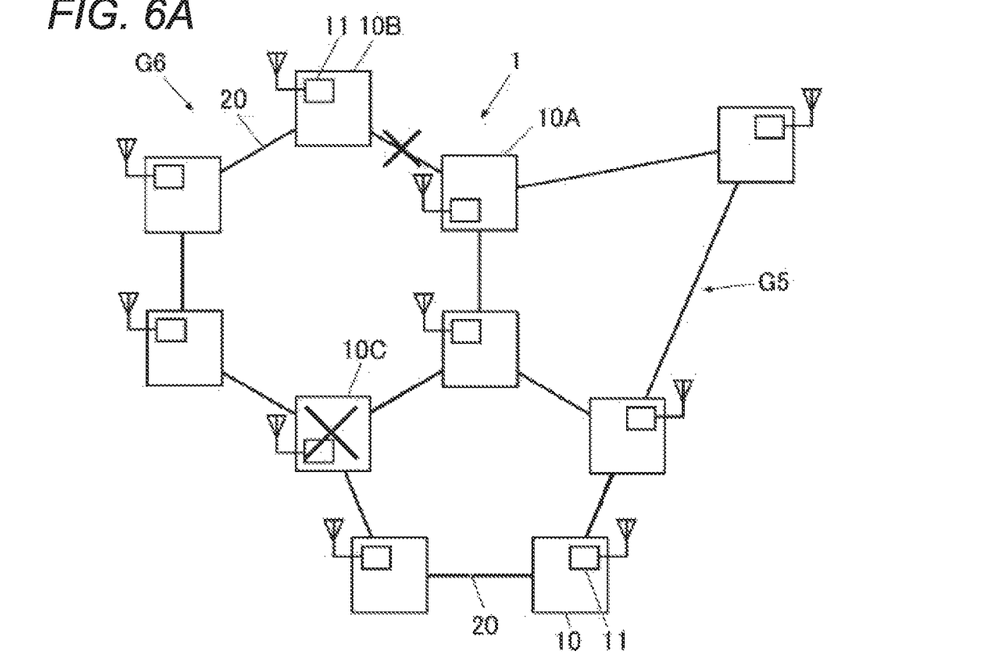
FIGS. 6A and 6B illustrate an example in which malfunction has occurred in a communication path and a device and the redundant system has been divided into two groups.
Figure 6B:
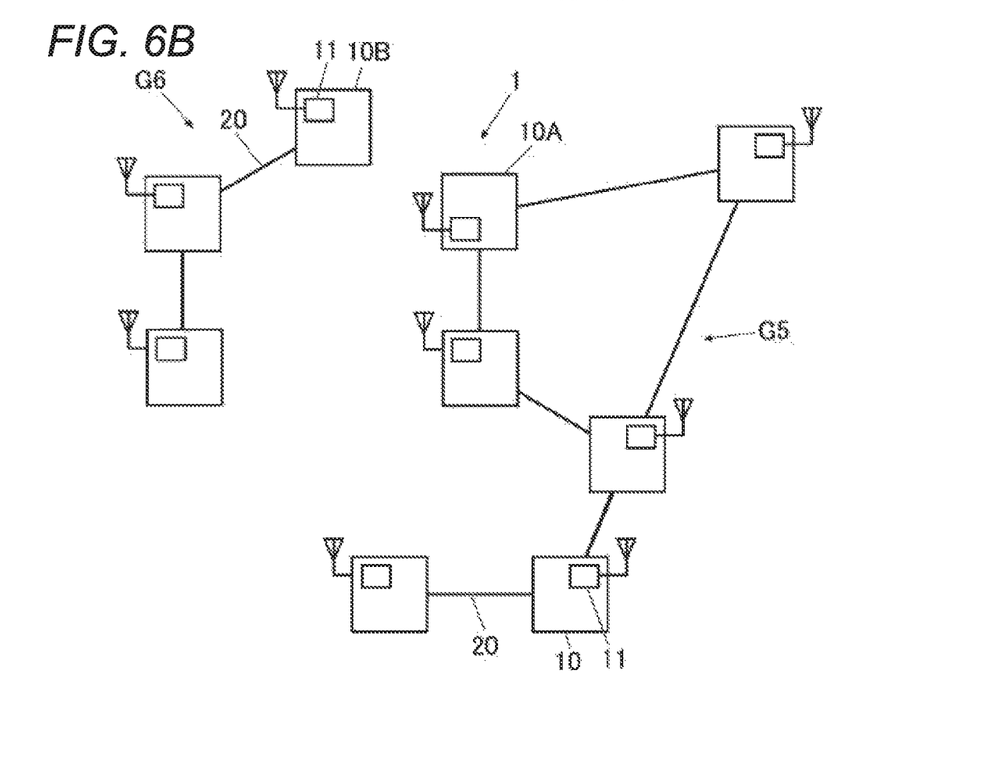

Next, description will be made on a case in which malfunction occurs in the device 10 using an example in which malfunction occurs in the device 10C as illustrated in FIGS. 6A and 6B.

As illustrated in FIGS. 6A and 6B, when malfunction occurs in the communication path 20 through which, for example, the device 10A is communicably coupled to the device 10B and then malfunction occurs in the device 10C, the redundant system 1 is also divided into two groups G5 and G6. Accordingly, a process such as switching the communication between groups to wireless communication is performed in a similar manner as described above. It is noted here that this process is the same as above and descriptions thereon will be omitted.

Advantages of Embodiments

As described above, in the redundant system 1 according to the embodiment, when malfunction occurs in two or more parts in the devices 10 and the communication paths 20 of the redundant system 1 in which the devices 10 are communicably coupled in a ring shape via the communication paths 20, the redundant system switches to wireless communication from the wired communication via the communication path 20 between (i) the device 10 of the group including the devices 10 capable of performing the wired communication with each other via the communication paths 20 (or a group consisting of one device 10 incapable of performing wired communication via the communication paths 20 with any devices 10 other than the one device 10) and (ii) the device 10 of another group incapable of performing wired communication via the communication paths 20 with the group, thereby continuing the communication.

Therefore, in the redundant system 1 according to the embodiment, even when malfunction occurs in two or more parts in the redundant system 1, communication between the devices 10 in which no malfunction occurs continues.

Inheritance of Process from the Device where Malfunction has Occurred

There is room for improvement in that when malfunction occurs in the device 10C and the malfunction is left unrepaired, control of equipment and appliances to be uniquely processed by the device 10C may not be performed.

Accordingly, when malfunction occurs in, for example, the device 10C, the process to be uniquely performed by the device 10C is inherited to a device 10 other than the device 10C.

This process will be described specifically below.

As described above, when determining that malfunction has occurred in the redundant system 1, each of the devices 10 communicates with the other devices 10, for example, exchanges information, recognizes the devices 10 with which the each of the devices 10 is communicable via the communication paths 20, performs wireless communication between groups, and recognizes which group is the main group. It is noted here that a group may consist of one device 10 as described above.

As a result of communication among the devices 10, when a device 10 belonging to no group is found (that is, the device 10 that returns no response), it is determined that malfunction has occurred in the device 10 (the device 10C in this example). According to the embodiment, each of the devices 10 determines that malfunction has occurred in a certain device (the device 10C in this example).

In the embodiment, when malfunction occurs in the device 10 (device 10C in this example) as described above, a device 10 of the main group inherits and performs the process originally performed by the device 10C in which malfunction has occurred.

Such a configuration allows the devices 10 (or one of the devices 10) of the main group to inherit and perform the process originally performed by the device 10C in which malfunction has occurred, thereby preventing the process originally performed by the device 10C from being not performed.

In this case, the device 10 of the isolated group does not inherit the process originally performed by the device 10C in which malfunction has occurred, and performs its own process.

Then, the devices 10 of the isolated group notify the main group of completion or non-completion of a certain process using wireless communication as well as the number of the devices 10 of the isolated group.

In the case described above, when classification into the main group or the isolated group is determined such that, for example, the group including the management device of the redundant system 1 is classified into the main group as described above, the management device may store, in advance, programs of all the devices 10 of the redundant system 1.

With this configuration, even when malfunction occurs in any of the devices 10, since the management device stores the programs to be used, the management device may inherit and perform the process based on the programs or may cause one of the devices 10 of the main group to inherit the process by transmitting the programs to be used to the device 10.

In addition, in the case where classification into the main group or the isolated group is determined based on, for example, the numbers of the devices 10 of the groups as described above, it is difficult to know the device 10 or the communication path 20 in which malfunction will occur in advance and it is difficult to know which of the devices 10 will belong to a main group and inherit the process originally performed by the device 10 in which the malfunction occurs in advance. Therefore, each of the devices 10 may store the programs of all the devices 10 of the redundant system 1 in advance.

With this configuration, even when malfunction occurs in any of the devices 10, since any of the devices 10 of the main group (group G5 in the example of FIGS. 6A and 6B) stores in advance the programs necessary for the process originally performed by the device 10 in which malfunction has occurred, the device 10 may inherit and perform the process based on the programs.

In addition, when one of the devices 10 of the main group inherits the process originally performed by the device 10C in which malfunction has occurred as described above, for example, one of the devices 10 of the main group that has enough processing power may inherit the process originally performed by the device 10C in which malfunction has occurred. Alternatively, multiple devices 10 of the main group may inherit and perform the process in corporation.

In addition, the device 10 communicably coupled to the equipment originally processed by the device 10 in which malfunction has occurred may inherit the process.

When the device 10 communicably coupled to the equipment originally processed by the device 10 in which malfunction has occurred is present in the isolated group but is absent in the main group, the device 10 of the isolated group may inherit the process originally processed by device 10 in which malfunction has occurred.

In addition, a table that contains all assumed cases in which malfunction occurs in the devices 10 and the communication paths 20 of the redundant system 1 may be prepared and, when malfunction occurs, the device 10 that inherits the processing originally performed by the device 10 in which malfunction has occurred may be determined based on the table.

It is appreciated that the present disclosure is not limited to the above embodiments, and modification may be made as appropriate without departing from the spirit of the disclosure.

The invention claimed is:

1. A redundant system comprising:
multiple devices, wherein
each of the devices is communicably coupled to two or more of the devices via two or more independent wired communication paths,
the each of the devices comprises a wireless communication unit,
when the redundant system is in a normal state, the each of the devices is configured to perform a wired communication via the two or more independent wired communication paths with the communicably coupled two or more of the devices,
when malfunction that interrupts the wired communication occurs in two or more parts of the redundant system, the multiple devices are divided into two or more groups such that wired communications among the two or more groups are disabled,
when the multiple devices are divided into the two or more groups in response to the malfunction occurring in the two or more parts of the redundant system, a first device in a first group of the two or more groups 1) performs the wired communication with a second device in the first group and 2) switches from the wired communication to a wireless communication to communicate with a third device in a second group of the two or more groups, and
when the two or more groups are classified into a main group and an isolated group, data is transmitted from a device of the isolated group to a device of the main group using the wireless communication and necessary data is simply transmitted from the device of the main group to the device of the isolated group using the wireless communication.

2. The redundant system according to claim 1, wherein the malfunction comprises either one or both of malfunction in the communication paths and malfunction in the devices.

3. The redundant system according to claim 2,
wherein the second group includes a fourth device, and
wherein when the first device of the first group performs the wireless communication with either or both of the third device and the fourth device under a multi input and multi output scheme, a multi input and single output scheme, or a single input and multi output scheme.

4. The redundant system according to claim 3, wherein if the malfunction occurs in one of the devices, the device of the main group inherits a process originally performed by the one of the devices in which the malfunction occurs and performs the process.

5. The redundant system according to claim 2, wherein the third device in the second group is incapable of performing the wired communication with any of the other devices of the multiple devices such that the second group includes only the third device.

6. The redundant system according to claim 2, wherein if the malfunction occurs in one of the devices, the device of the main group inherits a process originally performed by the one of the devices in which the malfunction occurs and performs the process.

7. The redundant system according to claim 1, wherein the wireless communication is of a multi input and multi output scheme, a multi input and single output scheme, or a single input and multi output scheme.

8. The redundant system according to claim 7, wherein the third device in the second group is incapable of performing the wired communication with any of the other devices of the multiple devices such that the second group includes only the third device.

9. The redundant system according to claim 7, wherein if the malfunction occurs in one of the devices, the device of the main group inherits a process originally performed by the one of the devices in which the malfunction occurs and performs the process.

10. The redundant system according to claim 1, wherein the third device in the second group is incapable of performing the wired communication with any of the other devices of the multiple devices such that the second group includes only the third device.

11. The redundant system according to claim 1, wherein if the malfunction occurs in one of the devices, the device of the main group inherits a process originally performed by the one of the devices in which the malfunction occurs and performs the process.

12. The redundant system according to claim 1,
wherein the two or more groups are classified into the main group and the isolated group based on the number of devices in each of the two or more groups, and
wherein a group having a larger number of devices than another group is classified as the main group while the another group is classified as the isolated group.

13. The redundant system according to claim 1, wherein the device of the main group transmits the necessary data to the device of the isolated group in response to the device of the isolated group requesting transmission of the necessary data.

* * * * *